United States Patent [19]

Peterson

[11] 4,346,532
[45] Aug. 31, 1982

[54] PLANTER

[76] Inventor: Paul D. Peterson, 3310 Azahar Pl., Rancho La Costa, Calif. 92008

[21] Appl. No.: 82,807

[22] Filed: Oct. 9, 1979

[51] Int. Cl.³ .............................................. A01G 9/02
[52] U.S. Cl. .......................................... 47/66; 47/71; 47/79
[58] Field of Search .............................. 47/59, 66-67, 47/70-71, 72, 79-81, 75

[56] References Cited

U.S. PATENT DOCUMENTS

| | | | |
|---|---|---|---|
| 129,451 | 7/1872 | Baldwin | 47/79 |
| 195,580 | 9/1877 | Crater | 47/80 |
| 289,102 | 11/1883 | Holden | 47/66 |
| 608,590 | 8/1898 | Freund | 47/75 |
| 1,773,020 | 8/1930 | Willis | 47/79 |
| 1,789,616 | 1/1931 | Bjorklund | 47/79 |
| 2,055,844 | 9/1936 | Kneller | 47/79 |
| 3,987,584 | 10/1976 | Yellin | 47/66 X |
| 4,173,097 | 11/1979 | Staby | 47/66 |

FOREIGN PATENT DOCUMENTS

| | | | |
|---|---|---|---|
| 344762 | 11/1936 | Italy | 47/71 |
| 96148 | 7/1939 | Sweden | 47/79 |
| 226414 | 4/1943 | Switzerland | 47/79 |
| 274452 | 7/1951 | Switzerland | 47/79 |

Primary Examiner—Robert E. Bagwill
Attorney, Agent, or Firm—Duane C. Bowen

[57] ABSTRACT

A planter double walled providing a central bottom chamber and a series of spoke-like air-passageways leading from the chamber to near the top of the planter where they have air vents, the double walls bulging to the inside of the planter container to form the chamber and air-passageways and there being aeration and moisture draining openings, in the relatively depressed areas between bulged walls, leading from the container to the chamber and gravel-like filtration material covering the aeration and moisture draining openings to prevent blockage thereof, and the chamber being domed above the level of the aeration and moisture draining openings.

15 Claims, 15 Drawing Figures

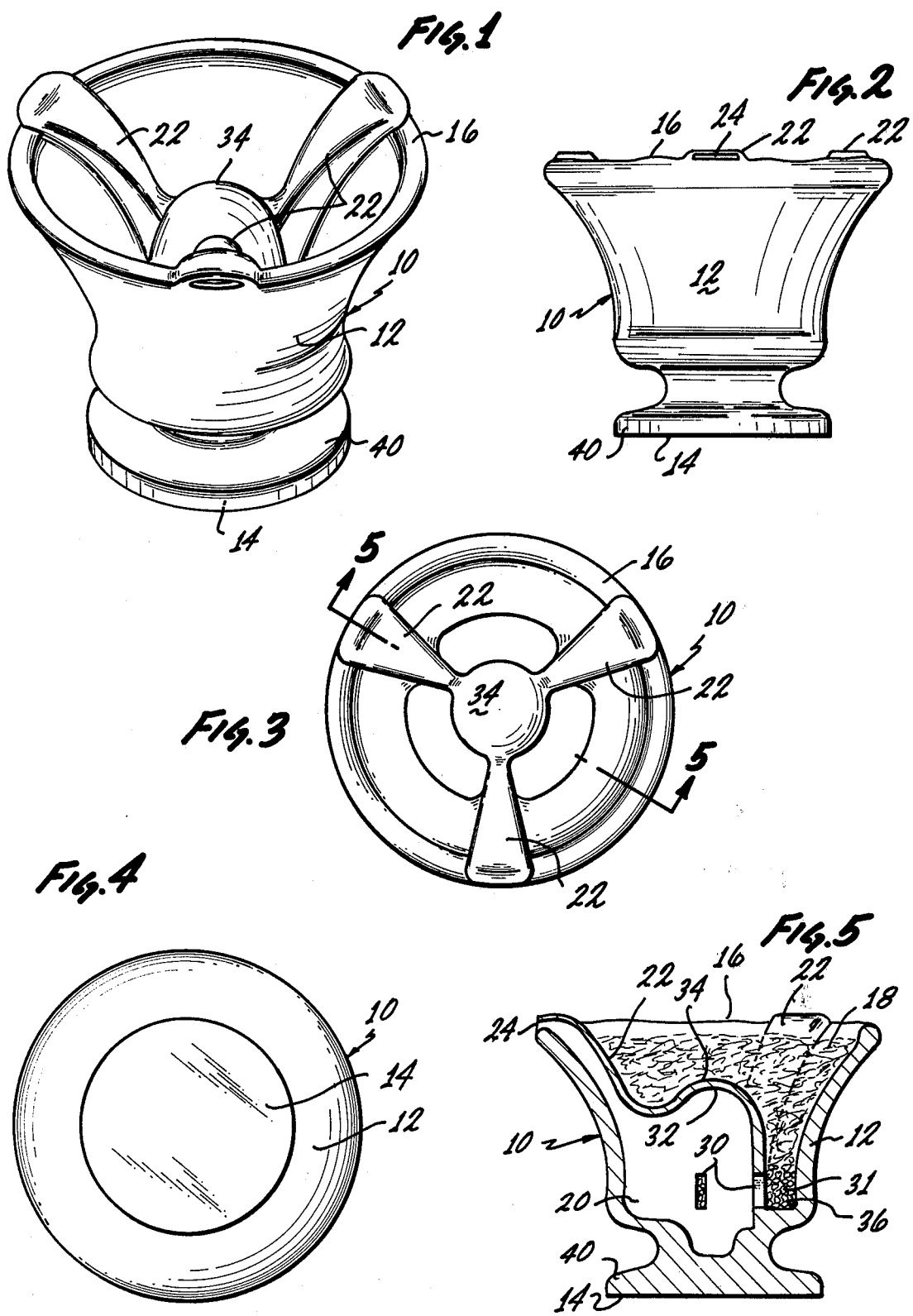

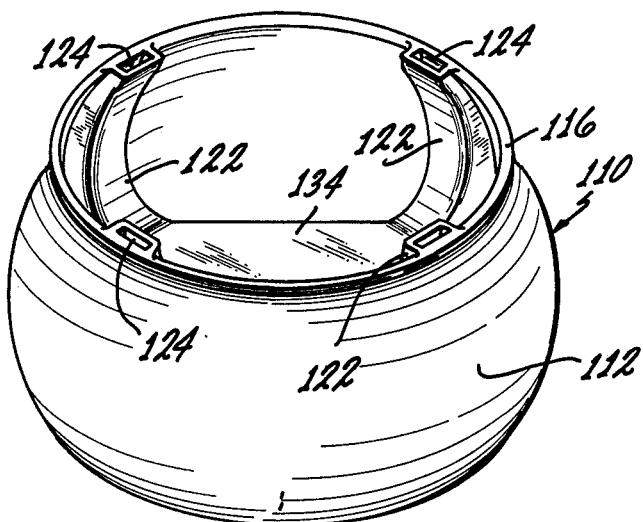
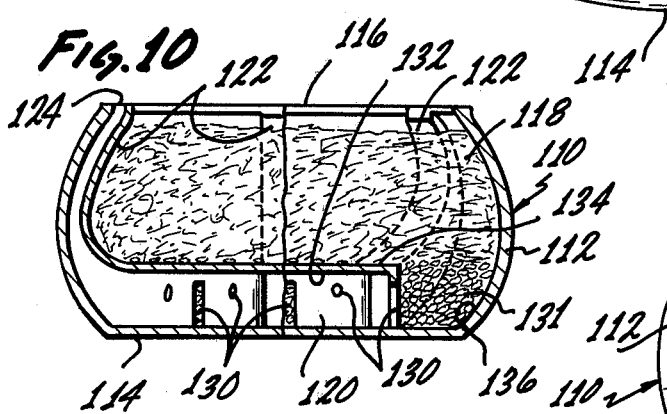
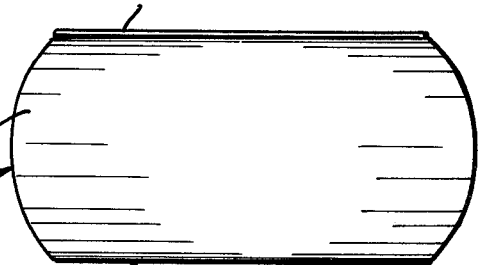
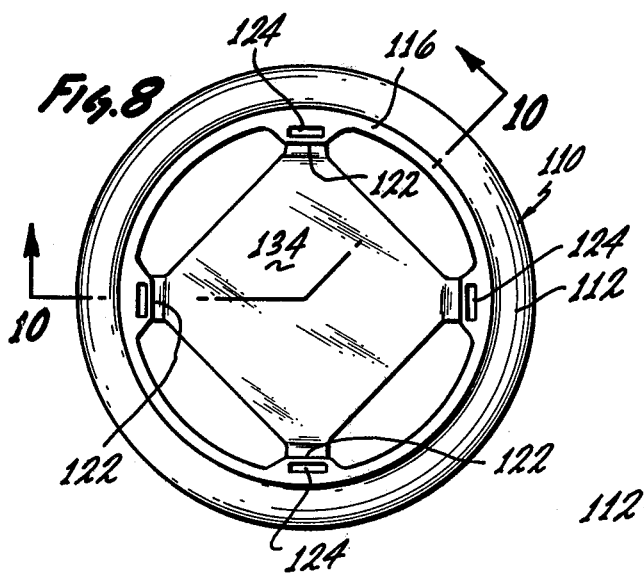
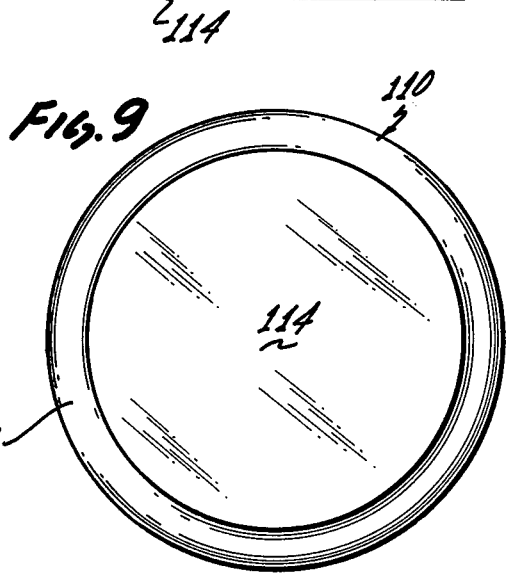

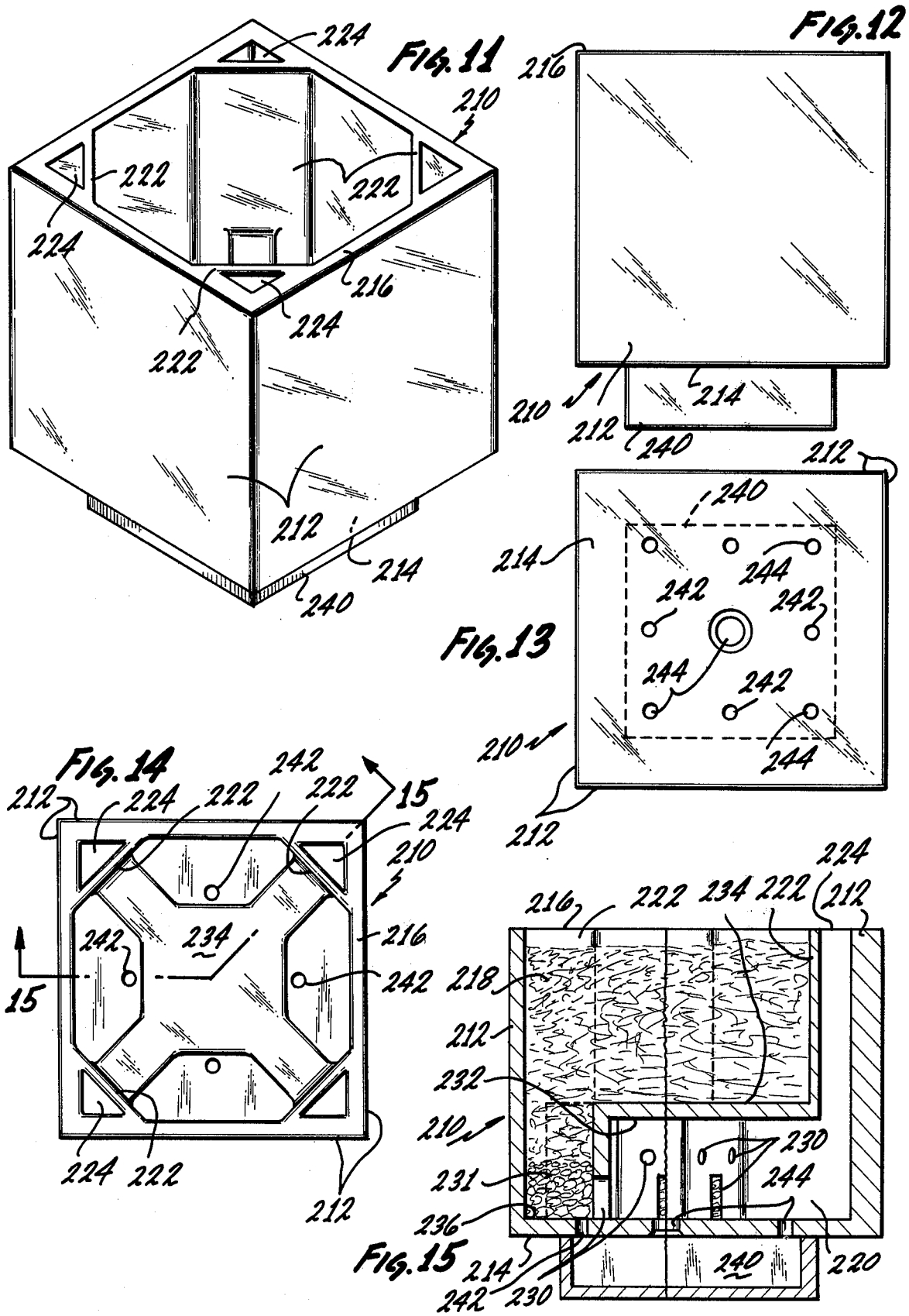

PLANTER

BRIEF SUMMARY OF THE INVENTION

BACKGROUND AND OBJECTIVES

My invention relates to a planter that is improved especially as to preventing soil waterlogging, in achieving soil aeration, and in avoiding soil salt accumulations.

I have given much thought to the above problems and I believe the planter construction disclosed herein comes closer to providing the combination of features above indicated as being desirable than the prior planters with which I am acquainted.

A preliminary examination search was conducted and the U.S. patents listed below (with which I previously was not acquainted) were cited by the searchers: Nos.
 2,713,753
 3,381,410
 3,935,672
 3,137,096
 3,783,555
 4,062,147
 3,243,919
 3,800,471

Of these patents, those having most pertinency might be considered to be 2,713,753, 3,783,555 and 3,137,096, but that is merely one opinion. None of the patents are believed to disclose the combinations set forth in the appended claims.

My objectives include: to provide a planter preventing soil waterlogging; to devise a planter achieving soil aeration; to provide a planter avoiding salt accumulations; to provide such aeration in a glazed ceramic or plastic planter; to design a planter of economical and attractive construction; and to provide designs that are practical to manufacture in quantity.

My invention will be best understood, together with additional objectives and advantages thereof, from the following description, read with reference to the accompanying drawing.

THE DRAWINGS

FIG. 1 is a perspective view of a specific embodiment of my new planter.

FIG. 2 is a side view thereof.

FIG. 3 is a top view thereof.

FIG. 4 is a bottom view thereof.

FIG. 5 is a sectional view taken as indicated by lines 5—5 of FIG. 3.

FIG. 6 is a perspective view of a modified embodiment of my new planter.

FIG. 7 is a side view thereof.

FIG. 8 is a top view thereof.

FIG. 9 is a bottom view thereof.

FIG. 10 is a sectional view taken as indicated as by lines 10—10 of FIG. 8.

FIG. 11 is a perspective view of a second modified embodiment of my new planter.

FIG. 12 is a side view thereof.

FIG. 13 is a bottom view thereof without its sub-base.

FIG. 14 is a top view thereof.

FIG. 15 is a sectional view taken as indicated by line 15—15 of FIG. 14.

DESCRIPTION OF INVENTION

Three forms of my invention are disclosed herein all having structural combinations preventing soil waterlogging, achieving soil aeration, and avoiding soil accumulation and all being economically manufacturable in quantity in either glazed ceramics or plastics. Of course they also could be manufactured in unglazed ceramics but one point of the present invention is that lack of soil aeration is more of a problem in glazed then unglazed ceramics.

In describing the invention, I will first point out those features common to the three forms of the invention that particularly deal with preventing waterlogging, providing aeration and avoiding depositing of salts.

A container 10, 110, 210 has side walls 12, 112, 212 and bottom walls 14, 114, 214 that are at least substantially closed and has a top 16, 116, 216 at least substantially open so as to be suitable to have plants growing in a planting medium 18, 118, 218 in the container. By the expression "planting medium" I mean either soil or the so-called "planting mediums" that are marketed and can be made of one or more ingredients including peat moss, mica, fertilizer, quantities of sand or gravel, dried manure or sludge, types of soil, etc.

The containers 10, 110, 210 have double walls at certain locations bringing a central bottom chamber 20, 120, 220 and one or more air passageways 22, 122, 222 leading from chamber 20, 120, 220 to near the top 16, 116, 216 thererof where there is an air vent 24, 124, 224 (usually directed upwardly or to the outside to avoid being blocked by planting medium 18, 118, 218) in order to vent the chambers. It can be said that the double walls forming chambers 20, 120, 220 and passageways 22, 122, 222 bulge to the interior of containers 10, 110, 210. Another description would be that the extra walls forming the central chambers and the air passageways are added to the inside of the normal contours of the planters or containers so as to provide the chambers and air passageways to the inside of containers 10, 110, 210. One manufacturing method will be to manufacture the basic containers 10, 110, 210 in one operation and to manufacture the second doubling walls forming chambers 20, 130, 220 and air passageways 22, 122, 222 separately and to suitably join the two (such as by bonding in the case of plastics, or such as by putting the two together in green states and applying slip to the abutting surfaces in the case of ceramics).

Usually there will be at least two and usually three or more diametrically opposed air passageways 22, 122, 222 spaced and oriented in spokelike radial disposition (like spokes of a wheel). In the configuration of FIGS. 1-5, three air passageways are shown 120° apart and in the other Figures four air passageways are shown 90° apart.

Containers 10, 110, 210 have horizontally extending aeration and moisture draining openings 30, 130, 230 leading from the container lower inner portions to chambers 20, 120, 220. Filtration material 21, 131, 231 of gravel or of gravel-like size cover openings 30, 130, 230 to prevent blocking thereof by planting medium 18, 118, 218 which blockage would interfere with aeration of the interiors of the containers by openings 30, 130, 230 and which blockage would interfere with drainage of excess moisture from the interiors of the containers by openings 30, 130, 230.

The aeration and moisture draining openings 30, 130, 230 connect to chambers 20, 120, 220 below the tops of the interiors of the chambers whereby the chambers have domes 32, 132, 232 above aeration and moisture draining openings 30, 130, 230 to collect vapors. The tops 34, 134, 234 of chambers 20, 120, 220 are preferably closed and solid so as to be free from vertical openings from the interiors of the containers directly vertically through the tops 34, 134, 234 to the interiors of chambers 20, 120, 220. Otherwise, such vertical openings could pass planting medium or moisture that could fill chambers 20, 120, 220 and interfere with the designed aeration and moisture draining functions of the networks of chambers 20, 120, 220, air passageways 22, 122, 222, air vents 24, 124, 224, aeration and moisture draining openings 30, 130, 230, filtration material 31, 131, 231, and domes 32, 132, 232 above the levels of the tops of openings 30, 130, 230.

Excess moisture in the interior of containers 10, 110, 210 can drain through openings 30, 130, 230 into chambers 20, 120, 220. Openings 30, 130, 230 are located in the relatively depressed areas 36, 136, 236 between the bulged doublewalled portions forming air passageways 22, 122, 222 and central chamber 20, 120, 220. These depressed areas 36, 136, 236 preferably will be largely or entirely filled with filtration material 31, 131, 231. Air can enter chambers 20, 120, 220 for aeration of planting medium 18, 118, 218 through openings 30, 130, 230 by the air passing through vents 24, 124, 224, through passageways 22, 122, 222 to chamber domes 32, 132, 232 that should be unblocked by moisture or planting medium. Vapor also can escape from chambers 20, 120, 220 via domes 32, 132, 232, passageways 22, 122, 222 and vents 24, 124, 224. Note that drainage of moisture from the interior of containers 10, 110, 210 through openings 30, 130, 230 to chambers 20, 120, 220 avoids the trapping of salts in the soil or planting medium that brings about soil stagnation.

The planter shown in the drawings was designed to avoid the following problems encountered with growing house plants in pots:
(1) Soil becoming waterlogged which causes root rot.
(2) Lack of soil aeration.
(3) Soil becoming encrusted with an accumulation of salts.

A meagre supply of water applied to the soil surface will not penetrate deeply to the roots where it is needed. Watering, when done, should be thorough. The plant microscopic root hairs, active in absorption of water and minerals, should not be allowed to wither and dry. When the top inch of the soil is dry and powdery to the touch, water is needed. However, if water is trapped in the bottom of the pot, this may waterlog the soil and cause root rot. Furthermore, a pot without drainage holes tends to trap salts in the soil which brings about soil stagnation.

Unglazed pottery with drainage holes are generally preferred to glazed containers without drainage holes because the former affords better aeration of the soil. However, glazed or plastic containers without the drainage holes are used primarily as a decorative planter, such as hanging pots or table planters where water spillage is not acceptable.

To restate the invention, it is the purpose of this invention to incorporate the desirable characteristics of the unglazed pottery planter with drainage holes into a glazed or non-porous material container without the standard drainage holes.

The planter is constructed of five main sections.
(1) Subterranean air chamber or dome 32, 132, 232
(2) Water storage reservoir or chamber 20, 120, 220
(3) Water vapor exhaust and air intake tunnels or passageways 22, 122, 222
(4) Water drainage ducts and aeration vents or openings 30, 130, 230
(5) Filtration pits 36, 136, 236

As water is added to the planter, it drains downward through the soil with the excess or unabsorbed water entering the filtration pits. Particulate matter is held back as the excess water passes through the filtration pits 36, 136, 236 and then into the water drainage ducts and aeration vents or openings 30, 130, 230. The water enters the water storage reservoir or chamber 20, 120, 220 where it is isolated from the soil in the planter. Above the water storage reservoir is located the subterranean air chamber or dome 32, 132, 232. Air is drawn into the water vapor exhaust and air intake tunnels or passageways 22, 122, 222 into the subterranean air chamber 32, 132, 232 where it is passed over the water reservoir 20, 120, 220. Water in storage begins to evaporate, mixing with the air. The air continues to move into the water drainage ducts and aeration vents or openings 30, 130, 230 and through the filtration pits 36, 136, 236 and into the soil at the bottom to mid area of the pot. Meanwhile, the water vapor now mixing in the subterranean air chamber begins to vent into and through the water vapor exhaust and air intake tunnels 22, 122, 222. The process of excess water removal and soil aeration continues while excess salt concentrations are being isolated at the bottom the water storage reservoir 20, 120, 220 by the process of evaporation.

The subterranean air chamber is located in the center and bottom of the pot. The water storage reservoir 20, 120, 220 is located below the subterranean air chamber. Three water vapor exhaust and air intake tunnels 22 are located 120 degrees apart in the configuration of FIGS. 1-5. Three water drainage ducts and aeration vents 30 are located one each in each of the filtration pits 36. The filtration pits 36 are located between the water vapor exhaust and air intake tunnels 22 spaced at 120 degrees.

The specific planter design of FIGS. 1-5 shown here has many possible variations. For example, the three water vapor exhaust and subterranean air intake tunnels could be four to one hundred or more tunnels. They could be one continuous sleeve 360 degrees around the entire pot. In that case, the filtration pits would become one 360 degree continuous pit. The water drainage ducts and aeration vents could be numerous vertical openings, 360 degrees around the base of the subterranean air chamber. These design variations, however, could function similarly to the configuration of FIGS. 1-5.

The shape and size of the specific planter illustrated in FIGS. 1-5 is the typical "V" shaped pot. However, the outside design of the planter could be of other shape and size. For example, the planter could be a household size round bottom bowl planter as well as a large outdoor concrete planter used on sidewalks for small trees or large plants. The internal design of the planter of FIGS. 1-5 can be adapted to most any container used for growing plants.

Three forms of my new planter are shown in the drawings. In FIGS. 1-5, container 10 has a shape commonly found in vases, which is round in top view and narrows from top to bottom except for flaring to a broad stable base 40. Because of the converging inner walls from top to bottom, the capacity of container 10 is limited relative to its overall envelope. The capacity is also reduced by the protrusion of the double walls forming air passageway 22 to the interior of container 10. The three passageways 22 seem a good choice for this type of pot. The various curved planes and rounded contours making up the general shapes of container 10 are believed to result in an attractive, natural object. The second walls to define the double walled passageways 22 and to define chamber 20 may be inserted after the rest of container 10 is formed and can be secured in place with slip in the case of ceramic construction and with adhesive in the case of plastic construction. The closed, solid top 34 is prominently rounded both horizontally and vertically. In cross section, the upper or inner walls forming passageways 22 are convexly curved.

In FIGS. 6-10, the container 110 is generally of geometrical roundness reminiscent of a sphere or an ellipsoid although of course the body is truncated at top and bottom. It may be better defined as a body with convex sides generated by a simple curve or arc rotated about a vertical axis. This type of body has good dirt and root capacity. It is largest in the middle vertically where roots tend to ball. In this particular container 110, it was elected to use four air passageways 122, which works out very well, as depicted, as space is not a problem. The extra doubling walls forming air passageways 122 and chamber 120 can be formed separately from the rest of container 110 and can later be inserted. In the case of ceramics, this would be done in a green, pliable state in order to insert the extra walls through the mouth at the top 116 of container 110, and then the walls could be pressed back into proper disposition. Slip would be applied at a proper time. In the case of plastics, the plastic material would need to be resilient in order to be inserted through the mouth of container 110. The inner plastic parts then could be bonded in place. Note, however, that either ceramic or plastic construction could be accomplished otherwise, i.e., the main container shell also could be divided. The top 134 of chamber 120 is closed and solid and is shown to be flat and disposed in a horizontal plane. Air passageways 122 in transverse cross-section are shown to be squared on the inside of container 110.

In FIGS. 11-15, a right-rectangular configuration is shown or, more specifically, a cubical shape. This type of container 210 especially is sometimes seen as large as two or three feet in width, especially in sizable plantings along streets, in parks or in large building landscaping, but of course the construction is also suitable for table top planter sizes. The flat, squared chamber 220 and air passageways 222 are rather like those in the FIGS. 6-10 version. Insertion of the doubling walls to form chamber 220 and passageways 222 is very easy if they are fabricated separately from the principal part of container 210. The top 234 of chamber 220 is closed, solid and flat. Passageways 222 can be fabricated by an extra bridging wall in each corner so that in horizontal section air passageways 222 are triangular.

In any version of the planter a sub-base could be used, but I show a sub-base 240 only in the FIGS. 11-15 construction. It makes an attractive and functional appearance as shown in which sub-base 40 is similar (right rectangular) in shape to container 210 but smaller and centered sub-base 240 has closed bottom and side walls and container bottom wall 214 covers the top of sub-base 240. These are openings 242 directly from container 210 to sub-base 240 and there are openings 244 directly from chamber 220 to sub-base 240. Openings 242, 244 to sub-base 240 provide additional drainage from container 210.

Having thus described my invention it will be understood that I do not wish to be restricted to the exact details of construction shown but instead wish to cover those modifications thereof that are properly within the scope of my invention.

I claim:

1. A planter, comprising:
   (a) a container with side and bottom walls at least substantially closed and with a top at least substantially open so as to be suitable to have plants growing in a planting medium in said container,
   (b) said container having double walls forming at least one chamber in the bottom of said container and forming at least one air passageway leading from said chamber to near the top of one of the side walls of said container and said container having an air vent to said air passageway near the upper end of said passageway thereby to vent said chamber,
   (c) said container having at least one generally horizontally extending, side aeration and moisture draining opening leading from its lower inner portion to said chamber and filtration material of gravel-like size covering said aeration and moisture draining opening to prevent blocking of said aeration and moisture draining opening with such planting medium, whereby said aeration and moisture draining opening will aerate the interior of said container and will drain excess moisture from the interior of said container, and
   (d) said aeration and moisture draining opening connecting to said chamber below the top of said chamber so that said chamber has a dome above said aeration and moisture draining opening to collect vapors, said chamber having a closed, solid top and being free from vertical openings from the interior of said container directly vertically through said dome to said chamber to prevent filling of said dome with moisture or planting medium.

2. A planter, comprising:
   (a) a container with side and bottom walls at least substantially closed and with a top at least substantially open so as to be suitable to have plants growing in a planting medium in said container,
   (b) said container having double walls forming at least one chamber in the bottom of said container and forming at least one air passageway leading from said chamber to near the top of one of the side walls of said container and said container having an air vent to said air passageway near the upper end of said passageway thereby to vent said chamber,
   (c) said container having at least one generally horizontally extending, side aeration and moisture draining opening leading from its lower inner portion to said chamber whereby said aeration and moisture draining opening will aerate the interior of said container and will drain excess moisture from the interior of said container, and
   (d) said aeration and moisture draining opening connecting to said chamber below the top of said chamber so that said chamber has a dome above said aeration and moisture draining opening to collect vapors, said chamber having a closed, solid top and being free from vertical openings from the interior of said container directly vertically through said dome to said chamber to prevent filling of said dome with moisture or planting medium.

3. The subject matter of claim 2 in which there are a plurality of spaced air passageways.

4. The subject matter of claim 3 in which there are three spoke-like air passageways 120° apart and said container is generally circular in plan view, there being as least one aeration and moisture draining opening between each pair of adjacent air passageways, the double walls forming said air passageways bulging to the interior of said container and said air passageways being located in the relatively depressed areas between said bulged air passageways, said closed, solid top of said chamber being rounded horizontally and vertically.

5. The subject matter of claim 3 in which there are four air passageways 90° apart, there being at least one aeration and moisture draining opening between each pair of adjacent air passageways.

6. The subject matter of claim 5 in which said closed, solid top of said chamber is flat.

7. The subject matter of claim 5 in which said container is generally circular in plan view and said air passageways are spoke-like and the double walls forming said air passageways bulge to the interior of said container and said air passageways being located in the relatively depressed areas between said bulged air passageways.

8. The subject matter of claim 5 in which said container is generally rectangular in plan view and said air passageways are at the corners of the rectangular outline and the double walls forming each air passageway at each corner of the rectangular outline is triangular in horizontal section.

9. The subject matter of claim 8 in which there is a sub-base centered below said container of right-rectangular form and smaller then said container and having closed bottom and side walls and said container bottom wall covering the top of said sub-base, there being openings from said chamber to said sub-base and there being opening directly from said container to said sub-base whereby said sub-base provides additional drainage from said container.

10. A planter, comprising:
(a) a container with side and bottom walls at least substantially closed and with a top at least substantially open so as to be suitable to have plants growing in a planting medium in said container, said container having an annular outline in plan view,
(b) said container having double walls forming a central chamber in the bottom of said container and forming a plurality of spaced air passageways leading spoke-like from said chamber to near the top of the side walls of said container and said container having an air vent to each air passageway near the upper ends thereof so as to vent said chamber, said double walls forming said air passageways bulging to the interior of said chamber, and
(c) said container having a plurality of aeration and moisture draining openings leading from its lower inner portion to said chamber and located in the relatively depressed areas of said container between said bulged air passageways whereby said aeration and moisture draining openings will aerate the interior of said container and will drain excess moisture from the interior of said container.

11. The subject matter of claim 10 in which said chamber has domed top curved both vertically and horizontally and in which said walls forming said air passageways in transverse cross-section are convexly curved on their upper and inner sides.

12. The subject matter of claim 10 in which said chamber has a flat top and in which the walls forming said air passageways in transverse cross-section are squared on the inside of said container.

13. A planter, comprising:
(a) a container with side and bottom walls at least substantially closed and with a top at least substantially open so as to be suitable to have plants growing in a planting medium in said container, said container being of right-rectangular shape,
(b) said container having double walls forming a central chamber in the bottom of said container and forming a plurality of spaced air passageways leading spoke-like to opposite corners of said container from said chamber and extending upwardly to near the top of the side walls of said container and said container having an air vent to each air passageway near the upper ends thereof so as to vent said chamber, said double walls forming said air passageways bulging to the interior of said chamber,
(c) said container having a plurality of aeration and moisture draining openings leading from its lower inner portion to said chamber and located in the relatively depressed areas of said container between said bulged air passageways whereby said aeration and moisture draining openings will aerate the interior of said container and will drain excess moisture from the interior of said container.

14. The subject matter of claim 13 in which said chamber has a flat top and in which the double walls forming said air passageways are formed by walls bridging said corners and thereby forming triangular outlines in transverse cross-sections of said air passageways.

15. The subject matter of claim 13 in which there is a sub-base centered below said container of right-rectangular form and smaller than said container and having closed bottom and side walls and said container bottom wall covering the top of said sub-base, there being openings from said chamber to said sub-base whereby said sub-base provides additional drainage from said container.

* * * * *